UNITED STATES PATENT OFFICE.

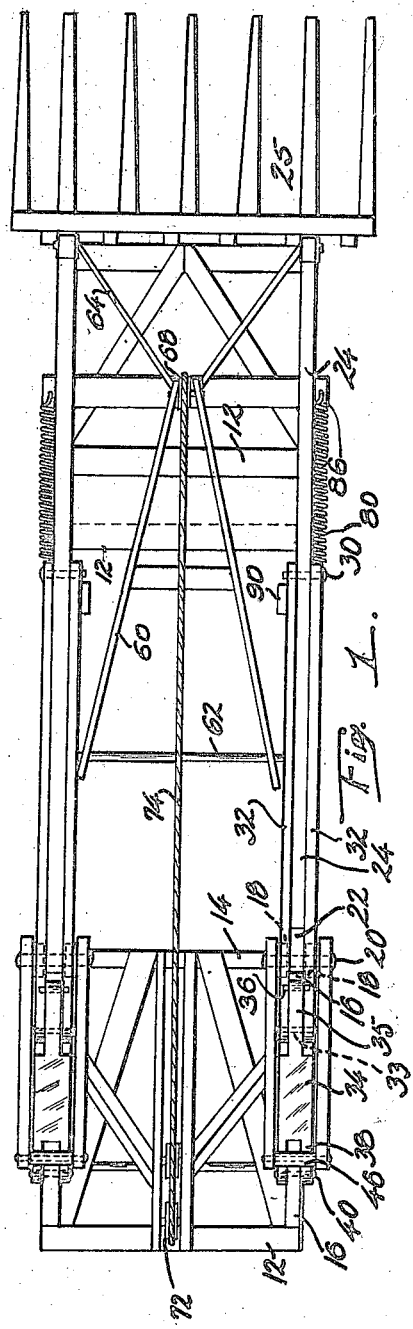
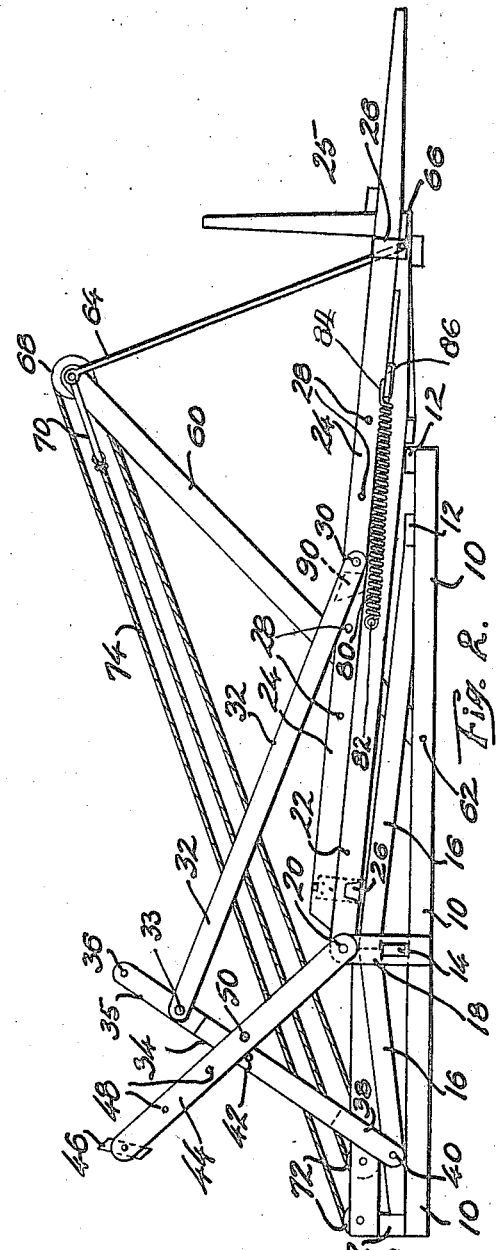

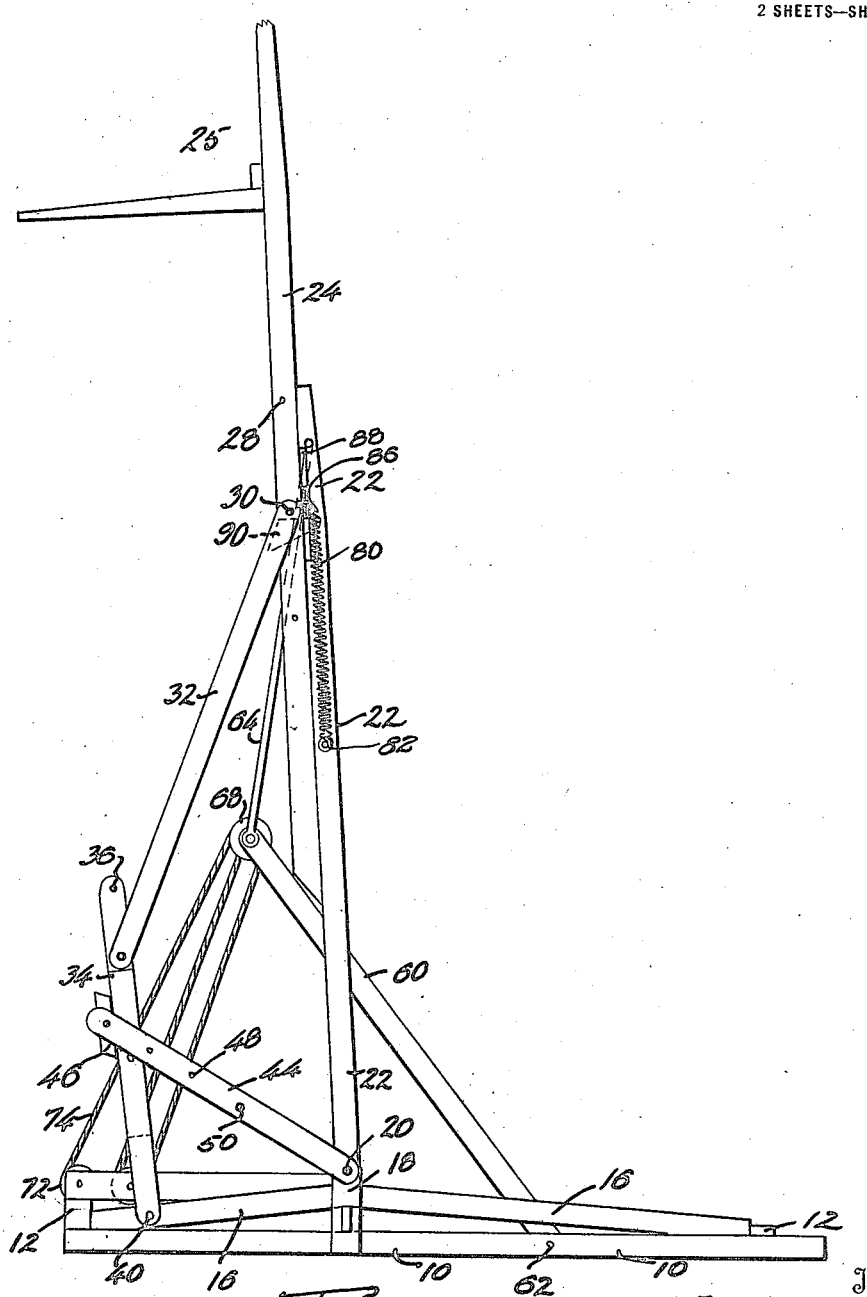

JOSEPH H. COPE, OF DENVER, COLORADO, ASSIGNOR TO THE WINDSOR MANUFACTURING COMPANY, OF WINDSOR, COLORADO, A CORPORATION OF COLORADO.

HAYSTACKER.

1,426,961.  Specification of Letters Patent.  Patented Aug. 22, 1922.

Application filed February 27, 1920. Serial No. 361,833.

*To all whom it may concern:*

Be it known that I, JOSEPH H. COPE, a citizen of the United States, residing at the city and county of Denver and State of Colorado, have invented certain new and useful Improvements in Haystackers; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide an efficient and cheaply constructed device for the purpose stated.

Briefly, the invention comprises a ground frame provided with upstanding standards to which are pivoted the lifting arms of the stacker, the lifting arms being positioned directly above the longitudinally extending timbers of the ground frame. The extension arms are slidable upon the lifting arms and are adapted to be extended by means of two-part jointed links. The forward end of one of the link parts on each side of the device is adapted to be pivoted on the extension arm at any one of a plurality of points, according to the amount of extension desired. The rear end of the other part of each link is pivoted to the rear of the framework, and this part extends through a stop device which extends upwardly, the lower end thereof being mounted either on the pivot for the corresponding lifting arm, or on a pivot on the framework at some point adjacent the said lifting arm pivot. Lifting means for elevating the stacker head are provided in the form of an A-frame, connected with the ground frame, rods connected with the upper end of the A-frame and with the lifting arms, and block and tackle for elevating the same.

In the drawing:

Fig. 1 is a plan of the invention.

Fig. 2 is a side elevation showing the device in lowered position; and

Fig. 3 is a side elevation showing the device extended almost to the limit of elevation.

The ground frame comprises longitudinally extending timbers 10 and end bars 12. A transverse beam 14 rests upon the timbers 10 and the abutting ends of truss bars 16 rest upon this beam, the opposite ends of the truss bars bearing upon the tops of the timbers 10. Short, upright standards or posts 18 are secured to the sides of each of the timbers 10 and the adjacent truss bars 16, the ends of the beam 14 projecting through these posts, as indicated in Fig. 2. At 20 the lifting arms 22 are pivotally mounted between the upper ends of the posts 18, so that these arms 22 lie directly above the timbers 10 and the adjacent truss bars 16. Extension arms 24 are slidably mounted upon the lifting arms 22 and retained in such relation by means of suitable guides 26. The extension arms 24 are provided with a plurality of holes 28, in any one of which a pin 30 may be positioned for the purpose of pivoting the forward ends of the forward sections 32 of the extension links. The sections 32 are pivoted at 33 to the rear sections 34 of the links. Each section 34 has its upper end in the form of a tongue 35, carrying a transverse pin 36 to serve as a stop for the adjacent section 32. The lower end of each section 34 is forked as indicated at 38, in order to straddle the truss bar 16 thereunderneath, to which it is pivoted at 40. Each section 34 carries a transverse pin 42, as indicated in Fig. 2, for the purpose of holding in elevated position the arms 44 of a stop element, which carries at its upper end a stop block 46, against which the section 34 bears when the stacker is in elevated position. The lower ends of the arms 44 may be pivoted on the pivot 20, which is also the pivot point for the lifting arms 22. The arms 44 are provided with a plurality of apertures 48 for receiving a removable pin 50, which is adjustable with the links 32, 34, according to the amount of extension desired. This pin 50 is to engage the forward face of the section 34 to limit its forward movement as the head descends in order to assure complete retraction of the extension arms 24.

An A-frame 60 is pivoted at 62 to the timbers 10 and has connected with its upper end a pair of lifting rods 64, which are connected with the forward ends of the lifting arms 22 as indicated at 66. The upper end of the frame 60 also carries a pulley 68, and an eye 70. The rear end of the framework carries a pair of pulleys 72, and over these parts a cable 74 is threaded for operating the A-frame 60 and the lifting rods 64.

Each of the lifting arms 22 has a spring 80 connected thereto at 82, the opposite end of the spring being provided with a hook 84, which engages a crossbar 86, adapted to slide in slots 88 in the upper sides of the lifting arms 22. Blocks 90, secured to the inner sides of the inner arms of the link sections 32 project down into position to engage with the rear edge of the bar 86, in order to advance said bar 86 in the slots 88 and tension the springs 80 when the arms 24 are extended.

In the operation of the device, the stop arms 44 bear upon the transverse pins 42 of the sections 34 in order to retain said arms in the position shown. The forward ends of the sections 32 are set in one of the holes 28, to give the extension required, and the pins 50 are set accordingly.

As the lifting arms 22 are elevated through the medium of the A-frame 60 and the rod 64, the sections 34 move rearward through the medium of the sections 32 until said sections 34 engage with the blocks 46 on the upper ends of the stop arms 44. As elevation continues, the link sections 32 cause the extension arms 24 to slide outwardly upon the lifting arms 22, since movement of the sections 34 is prevented by the blocks 46. During this movement the blocks 90 on the link sections 32 come into engagement with the transverse bar 86 and during the latter part of the extension of the arms 24 this bar 86 places the springs 80 under tension so that when the stacker head has passed over the dead center at pivot 20, the springs 80 are under considerable tension, which is transmitted by means of the bar 86 and the blocks 90 to the links 32, and thereby to the extension arms 24 through the pins 30. Thus, after the load has been thrown from the stacker head 25 and draft on the cable 74 is released, the springs 80 will cause the arms 24 and head 25 to be drawn back over the dead center at 20, whereupon the weight of the head will cause the same to descend.

The transverse pins 36 in the upper ends of the tongues 35 of the link sections 34, serve as stops for the link sections 32 when the stacker head is at its uppermost and rearmost position. By this means doubling back of the link sections 32 and 34 about the pivot points 33 is prevented.

It will be noted particularly that the construction here disclosed with reference to the link sections 32 and 34 and the stop arms 44 and stop blocks 46, is novel. Also, the pivoting of the lifting arms 22 directly above the timbers 10 is novel.

I claim:

1. In a stacker, a main frame, a slidable extension arm, a stacker head on said arm, means to lift said arm and head, and means for extending said arm comprising a jointed link having two members pivoted together, one of which is pivoted to the frame and the other is pivoted to the extension arm.

2. In a stacker, a main frame, a slidable extension arm, a stacker head on said arm, means to lift said arm and head, a jointed link for extending said arm comprising two members pivoted together, one of which is pivoted to the frame and the other is pivoted to the extension arm, and means to limit both forward and rearward movement of that link member which is pivoted to the frame.

3. In a stacker, a main frame, a lifting arm, an extension arm slidable on said lifting arm, means to lift said arms and head, and means to slide said extension arm on the lifting arm comprising a jointed link having two members pivoted together, one of which is pivoted to the main frame and the other to the extension arm.

4. In a stacker, a main frame, a lifting arm, an extension arm slidable on said lifting arm, means to lift said arms and head and means to slide said extension arm on the lifting arm comprising, a jointed link having two members pivoted together, one of which is pivoted to the main frame and the other to the extension arm, and means to limit both forward and rearward movement of that link member which is pivoted to the frame.

5. In a stacker, a main frame, a lifting arm, an extension arm slidable on said lifting arm, means to lift said arms and head and means to slide said extension arm on the lifter arm comprising, a jointed link having two members pivoted together, one of which is pivoted to the main frame and the other to the extension arm, and a spring pull-back adapted to be placed under tension as said extension arm approaches its limit of extension.

6. In a stacker, a main frame, a lifting arm, an extension arm slidable on said lifting arm, means to lift said arm and head, a jointed link comprising two members pivoted together, one of which is pivoted to the main frame and the other to the extension arm, a spring pull-back adapted to be placed under tension as said extension arm approaches its limit of extension, said pull-back comprising means slidable on said lifting arm, a spring connecting said means with said lifting arm, and a device on said link to engage said means to extend the same.

7. In a stacker, a main frame, a slidable extension thereon, a stacker head on the arm, means to lift the arms and head, and means for extending said arm as it is lifted comprising a jointed link pivoted to the arm and to the frame.

8. In a stacker, a main frame, a lifting arm, an extension arm slidable on said lifting arm, a stacker head on said extension arm, means to lift said arms and head, and means for sliding the extension arm on the lifting arm comprising a jointed link pivoted to the extension arm and to the frame.

9. In a stacker, a main frame, an extension arm having a stacker head thereon, means to lift said arm and head, a jointed link for extending said arm as it is lifted comprising two members pivoted together, one member being pivoted to the main frame and the other to the extension arm, and means to limit the rearward movement of said link members.

10. In a stacker, a main frame, an extension arm having a stacker head thereon, means to lift said arm and head, a jointed link for extending said arm as it is lifted comprising two members pivoted together, one member being pivoted to the main frame and the other to the extension arm, means to limit the rearward movement of said link members, and a guide for said link.

11. In a stacker, a main frame, an extension arm having a stacker head thereon, means to lift said arm and head, a jointed link comprising two members pivoted together, one member being pivoted to the main frame and the other to the extension arm, and means to limit the rearward movement of said link members, said limiting means comprising a guide and a stop on said guide for engagement by the link.

12. In a stacker, a main frame, a lifting arm pivoted to the frame, an extension arm slidable on said lifting arm, a link member pivoted at the rear of the pivot of said lifting arm, a second link member pivoted to the first mentioned member and pivoted also to said extension arm, a stacker head on said extension arm, means to lift said arms and head, and a spring pull-back adapted to be placed under tension as said extension arm approaches its limit of extension.

13. In a stacker, a main frame, a lifting arm pivoted to the frame, an extension arm slidable on said lifting arm, a link member pivoted in the rear of the pivot of said lifting arm, a second link member pivoted to the first mentioned link member, and pivoted also to said extension arm, a stacker head on said extension arm, means to lift said arms and head, means to limit both forward and rearward movement of that link member which is pivoted to the frame, and a spring pull-back adapted to be placed under tension as said extension arm approaches its limit of extension.

14. In a stacker, a main frame, a lifting arm pivoted on the frame, an extension arm slidable on the lifting arm, a link member pivoted on the frame, a second link member pivoted to the first mentioned member and pivoted also to said extension arm, a stacker head on said extension arm, and means to lift said arms and head, a stop member for said link, the upper portion of the first mentioned link member being adapted to engage said stop member when the stacker is in elevated position, and the pivot point of the second member on the extension arm being adapted to lie forward of the center line of said first member when in said position to prevent collapse of said members under load.

15. In a stacker, a main frame, a lifting arm pivoted on the frame, an extension arm slidable on the lifting arm, a link member pivoted on the frame, a second link member pivoted to the first mentioned member and pivoted also to said extension arm, a stacker head on said extension arm, and means to lift said arms and head, the upper part of the first mentioned link member being adapted to be retained in position when said stacker is elevated to prevent collapse of said link members under load.

16. In a stacker, a main frame, a lifting arm pivoted on the frame, an extension arm slidable on the lifting arm, a link member pivoted on the frame, a second link member pivoted to the first mentioned member and pivoted also to said extension arm, a stacker head on said extension arm, means to lift said arms and head, and a stop to be engaged by the upper part of the first mentioned link member to retain the latter in position when said stacker is elevated to prevent collapse of said link members under load.

17. In a stacker, a main frame, a lifting arm pivoted thereto, an extension arm slidable on the lifting arm, a link member pivoted on the frame, a second link member pivoted to the first mentioned member and pivoted also to said extension arm, a stacker head on said extension arm, means to lift said arms and head, a stop connected with the frame and adapted to be engaged by the upper part of the first mentioned link member to limit the movement thereof.

18. In a stacker, a main frame, comprising a post, a longitudinally extending timber, spaced members connected with the upper portion of said post and with said timber, braces on the sides of the timber, a lifting arm, an extension arm slidable on said lifting arm, a link connected at one end to said extension arm and having the other end extending between and guided by said spaced members, the lifting arm being positioned directly above said timber with its rear end lying between said braces.

19. In a stacker, a main frame, spaced members connected with said frame, a lifting arm, an extension arm slidable thereon, the rear end of the lifting arm lying between said spaced members, and a link connected at one end to said extension arm and having the other end extending between and guided by said spaced members.

20. In a stacker, a main frame, spaced guides connected with said frame, a lifting arm, an extension arm slidable thereon, a link member connected at one end to said extension arm, and a second link member connected at one end to said frame and at its other end to the other end of the first named link member, said second member extending between and guided by said spaced guides.

21. In a stacker, a lifting arm, an extension arm, a two-part jointed link to extend the extension arm, and a stop to be engaged by one part of said link to limit rearward motion.

22. In a stacker, a lifting arm, an extension arm, a jointed link to extend the extension arm, and a stop to be engaged by said link to limit rearward motion, one end of the link being pivoted to the extension arm and the other end to the frame.

23. In a stacker, a frame including a ground timber, a pivoted lifting arm lying over said timber, an extension arm slidable on said lifting arm, means to lift said arms, and means to extend said extension arm as said arms are being lifted, said extension means comprising a jointed link connected with the frame and with the extension arm.

24. In a stacker, a frame including a ground timber, a post secured at the side of said timber, a lifting arm lying over said timber and pivoted to said post, an extension arm slidable on said lifting arm, means to lift said arms, and means to extend said extension arm while the arms are being lifted, said extending means comprising a two part jointed link connected with the extension arm.

25. In a stacker, a frame including a a ground timber, a post secured at the side of said timber, a lifting arm lying directly above said timber and pivoted to said post, an extension arm slidable on said lifting arm, means to lift said arms, and means to extend said extension arm while the arms are being lifted, said extending means comprising a jointed link having one part pivoted to the extension arm and another part pivoted to the frame.

26. In a stacker, a frame including a ground timber, a post secured at the side of said timber, a lifting arm lying directly above said timber and pivoted to said post, an extension arm slidable on said lifting arm, means to lift said arms, means to extend said extension arm while the arms are being lifted, said extending means comprising a jointed link having one part pivoted to the extension arm and another part pivoted to the frame, and a stop for limiting the rearward movement of said link.

27. In a stacker, a lifting arm, an extension arm, and means comprising a two-part jointed link to extend the extension arm.

28. In a stacker, a lifting arm, an extension arm, and means comprising a two-part jointed link to extend the extension arm, said jointed link being pivotally mounted.

29. In a stacker, a lifting arm, an extension arm, a two-part jointed link to extend the extension arm, and a stop to be engaged by one part of said link to limit motion.

30. In a stacker, a lifting arm, an extension arm, a two-part jointed link to extend the extension arm, and a stop to be engaged by one part of said link to limit motion, said jointed link being pivotally mounted.

31. In a stacker, a main frame, a slidable extension arm, a stacker head on said arm, means to lift said arm and head, and a jointed link to extend the arm comprising two members pivoted together.

32. In a stacker, a main frame, a slidable extension arm, a stacker head on said arm, means to lift said arm and head, and a jointed link to extend the arm comprising two members pivoted together, said jointed link being pivotally mounted.

33. In a stacker, a main frame, a slidable extension arm, a stacker head on said arm, means to lift said arm and head, and a jointed link comprising two members pivoted together, one of said members being adapted to be pivotally connected with said extension arm and in fixed relation thereto, means being provided for providing said fixed pivotal connection at various points as desired to furnish various adjustments for varying extensions of said head.

34. In a stacker, a main frame, a slidable extension on a stacker head on said arm, means to lift said arm and head, a jointed link comprising two members pivoted together, one of said members being connected with said extension arm, and a stop adapted to be engaged by the other member of said link to limit motion thereof.

35. In a stacker, a main frame, a slidable extension arm, a stacker head on said arm, means to lift said arm and head, and a jointed link comprising two members pivoted together, one of said members being connected with the extension arm and bodily movable with respect to said frame.

36. A stacker, comprising in combination, a ground timber, a pivoted lifting arm lying directly above said timber, a pair of spaced upwardly projecting post members provided with a pivot pin near their tops for co-operating with the lifting arm, an extension arm slidable on said lifting arm, and means comprising a two part jointed link for sliding said extension arm on the lifting arm as the latter is moved about its pivot.

37. In a stacker, a frame, a backstop, a two-part extension link one part of which is adapted to engage said stop, a lifting arm with which the other part of the link is connected, said arm being pivoted to the frame forward of the stop.

38. In a stacker, a frame, a backstop, a two part extension link one part of which is adapted to engage said stop, a lifting arm with which the other part of the link is connected, said arm being pivoted to the frame forward of the stop, whereby said link when engaged with said stop constitutes a brace for the elevated portions.

39. In a stacker, a main frame having a ground timber, a lifting arm thereon, an extension arm on the lifting arm, and an inclined link connected with the extension arm, the rear end of the lifting arm being pivoted on the frame at a point elevated from the ground timber so as to cause the lifting arm to incline downward as it extends forward, whereby the link is nearer in line with the lifting arm.

40. In a stacker, a main frame having substantially parallel sides, a lifting frame having parallel arms on said frame, a pair of spaced braces secured to each of said frame sides, the ends of the lifting arms lying over the sides of the frame and pivoted between said braces.

41. In a stacker, a lifting arm, an extension arm, a two-part jointed link to extend the extension arm, a stop to be engaged by one part of said link to limit rearward movement thereof, and means at said joint to limit swinging of the other part about the joint to prevent doubling back at the joint.

42. In a stacker, a frame, a lifting arm, an extension arm, a two-part jointed link to extend the extension arm, a stop to be engaged by one part of the link to limit rearward movement thereof, one part of the link having a portion extending beyond said joint, and means on said extending portion to engage the other part of the link and prevent doubling back at said joint.

In testimony whereof I affix my signature.

JOSEPH H. COPE.